United States Patent
Kemper

(10) Patent No.: US 9,375,841 B1
(45) Date of Patent: Jun. 28, 2016

(54) ROBOTIC DEVICES WITH AMBIENT INDICATIONS OF JOINT STATUS

(71) Applicant: Google Inc., Mountain View, CA (US)

(72) Inventor: Kevin Kemper, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/288,438

(22) Filed: May 28, 2014

(51) Int. Cl.
*B25J 19/02* (2006.01)
*B25J 9/16* (2006.01)

(52) U.S. Cl.
CPC ..................................... *B25J 9/1674* (2013.01)

(58) Field of Classification Search
CPC ........ B25J 9/1674; B25J 9/1694; B25J 19/02; B25J 19/025; B25J 19/027; B25J 19/028; B25J 19/04; B25J 19/06; G06F 9/00; G06F 9/226; G06F 11/32; G06F 11/321; G06F 11/324; G06F 11/325; G06F 11/326; G06F 11/327
See application file for complete search history.

(56) References Cited

U.S. PATENT DOCUMENTS

| | | | |
|---|---|---|---|
| 4,786,847 A | 11/1988 | Daggett | |
| 5,299,288 A | 3/1994 | Glassman et al. | |
| 5,917,428 A * | 6/1999 | Discenzo | G01R 31/343 307/116 |
| 6,297,742 B1 * | 10/2001 | Canada | G01R 31/343 318/490 |
| 6,785,572 B2 | 8/2004 | Yanof et al. | |
| 8,100,133 B2 | 1/2012 | Mintz et al. | |
| 8,145,492 B2 | 3/2012 | Fujita | |
| 8,369,992 B2 | 2/2013 | Barajas et al. | |
| 2007/0163136 A1 | 7/2007 | Eaton | |
| 2007/0182551 A1 * | 8/2007 | Yang | B65F 1/08 340/545.3 |
| 2008/0013958 A1 | 1/2008 | Katsuki et al. | |
| 2008/0255772 A1 * | 10/2008 | Sjostrand | B25J 9/1674 702/34 |
| 2013/0274894 A1 | 10/2013 | Goldfarb et al. | |

FOREIGN PATENT DOCUMENTS

| | | | |
|---|---|---|---|
| JP | 2011062792 A | * | 3/2011 |
| JP | 2012-218139 | | 11/2012 |
| JP | 2012218139 A | * | 11/2012 |

OTHER PUBLICATIONS

International Search Report and Written Opinion prepared by the Korean Patent Office in International Application No. PCT/US2015/025506 mailed Jun. 30, 2015.

* cited by examiner

*Primary Examiner* — Stephen Holwerda
(74) *Attorney, Agent, or Firm* — McDonnell Boehnen Hulbert & Berghoff LLP

(57) ABSTRACT

In examples, robotic devices with ambient indications of joint status are provided. An example robotic device includes one or more actuators coupled through one or more joints to form a robotic manipulator, and an indicator co-located in proximity to the one or more joints to provide visual feedback on the robotic manipulator at the one or more joints and about the one or more joints. The visual feedback may include information indicative of an operating status of the one or more joints including an indication of an amount of torque that the one or more joints is experiencing. The robotic device also includes a controller programmable to control the indicator co-located proximal to the one or more joints to provide the visual feedback indicative of the operating status of the one or more joints.

18 Claims, 4 Drawing Sheets

ROBOTIC DEVICES WITH AMBIENT INDICATIONS OF JOINT STATUS

BACKGROUND

Unless otherwise indicated herein, the materials described in this section are not prior art to the claims in this application and are not admitted to be prior art by inclusion in this section.

A robotic device includes a mechanical agent, usually an electro-mechanical machine that is guided by a computer program or electronic circuitry. Robots can be autonomous or semi-autonomous and range from humanoid designs, to large industrial designs with jointed arms and end effectors to perform specialized tasks.

Many interfaces have been designed to enable control of robotic devices, and to receive feedback information from the robotic devices. Such interfaces are often provided remotely from the robotic devices, such as in a control center for an operator, for example. The interfaces may provide numerous amounts of information of the robotic devices, including factors related to health of the robotic device.

Robotic devices may also include various indicators to provide notifications to a user. Example indicators include lights to inform that power is on, a battery is charging, a connection is in place with a remote network, or a strength of signal in place with the remote network.

SUMMARY

In examples, robotic devices with ambient indications of joint status are provided. An example robotic device comprises one or more actuators coupled through one or more joints to form a robotic manipulator, and an indicator co-located in proximity to the one or more joints to provide visual feedback on the robotic manipulator at the one or more joints and about the one or more joints. The visual feedback includes information indicative of an operating status of the one or more joints. The robotic device also includes a controller programmable to control the indicator co-located proximal to the one or more joints to provide the visual feedback indicative of the operating status of the one or more joints.

In another example, a robotic device is provided that comprises one or more actuators coupled through one or more joints to form a robotic manipulator, an indicator co-located in proximity to the one or more joints to provide visual feedback on the robotic manipulator at the one or more joints and about the one or more joints, and a strain gauge for determining a tension experienced by the one or more actuators at the one or more joints. The robotic device also comprises a controller coupled to the strain gauge for receiving information indicating the tension and for controlling the indicator co-located proximal to the one or more joints to provide the visual feedback indicative of the tension experienced.

In still another example, a robotic device is provided that comprises a plurality of actuators coupled through a plurality of joints to form a robotic manipulator, a plurality of indicators co-located in proximity to the plurality of joints to provide visual feedback on the robotic manipulator at the plurality of joints and about the plurality of joints, and a controller coupled to the plurality of indicators for receiving information indicating a status of respective joints of the plurality of joints and for controlling the plurality of indicators co-located proximal to the plurality of joints to provide the visual feedback indicative of the status of the respective joints.

In another example, a system that includes one or more actuators coupled through one or more joints to form a robotic manipulator is provided that includes a means for receiving information indicative of an operating status of the one or more joints including an indication of an amount of torque that the one or more joints is experiencing, and a means for controlling an indicator co-located proximal to the one or more joints to provide visual feedback indicative of the operating status of the one or more joints on the robotic manipulator at the one or more joints and about the one or more joints.

In yet another example, a method is provided that comprises providing one or more actuators coupled through one or more joints to form a robotic manipulator, receiving information indicative of an operating status of the one or more joints including an indication of an amount of torque that the one or more joints is experiencing, and controlling an indicator co-located proximal to the one or more joints to provide visual feedback indicative of the operating status of the one or more joints on the robotic manipulator at the one or more joints and about the one or more joints.

In still other examples, further methods and computer program products including instructions executable by a device or by one or more processors to perform functions of the methods are provided. The methods may be executable for operating a robotic device, for example. The methods may also be executable to control indicators of the robotic device so as to provide visual feedback information about operating characteristics of portions of the robotic device.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a robotic device may include multiple actuators coupled through joints, and the joints may be configured as multiple degree of freedom (DOF) joints. The robotic device may be able to communicate to an interface data regarding operation of the device, such as a load or tension being applied to or experienced by a joint, for example. However, the interface may not be co-located with the robotic device.

Within examples, indicators may be provided at joints of a robotic device to provide information of the robotic device at the joint. As an example, a tri-color LED can be located at each joint to indicate may types of joint-specific information, such as to light up a certain color to show a joint "effort" and operators can easily determine how close the robotic device is to an operating limits. The LED color could be diffused or piped through a cover or through a specific feature to blend the color for overall aesthetics.

As a specific example, for an industrial robotic arm, a tri-color LED may be used to indicate status of the arm. With the arm, the light may be red to indicate a maximum torque is being applied due to a heavy load, or the light may be green when the arm is operating within the operating limits. Other types of indicating can be used such as blinking lights, light patterns, color patterns, etc., all or any of which may be indicative of a certain status of the joint.

The LEDs are co-located at joints to provide feedback on the robotic at the joint and about the joint itself. Thus, an operator in view of the robotic device can infer a status of the joint based on the indicators at the joint.

Figure 1:
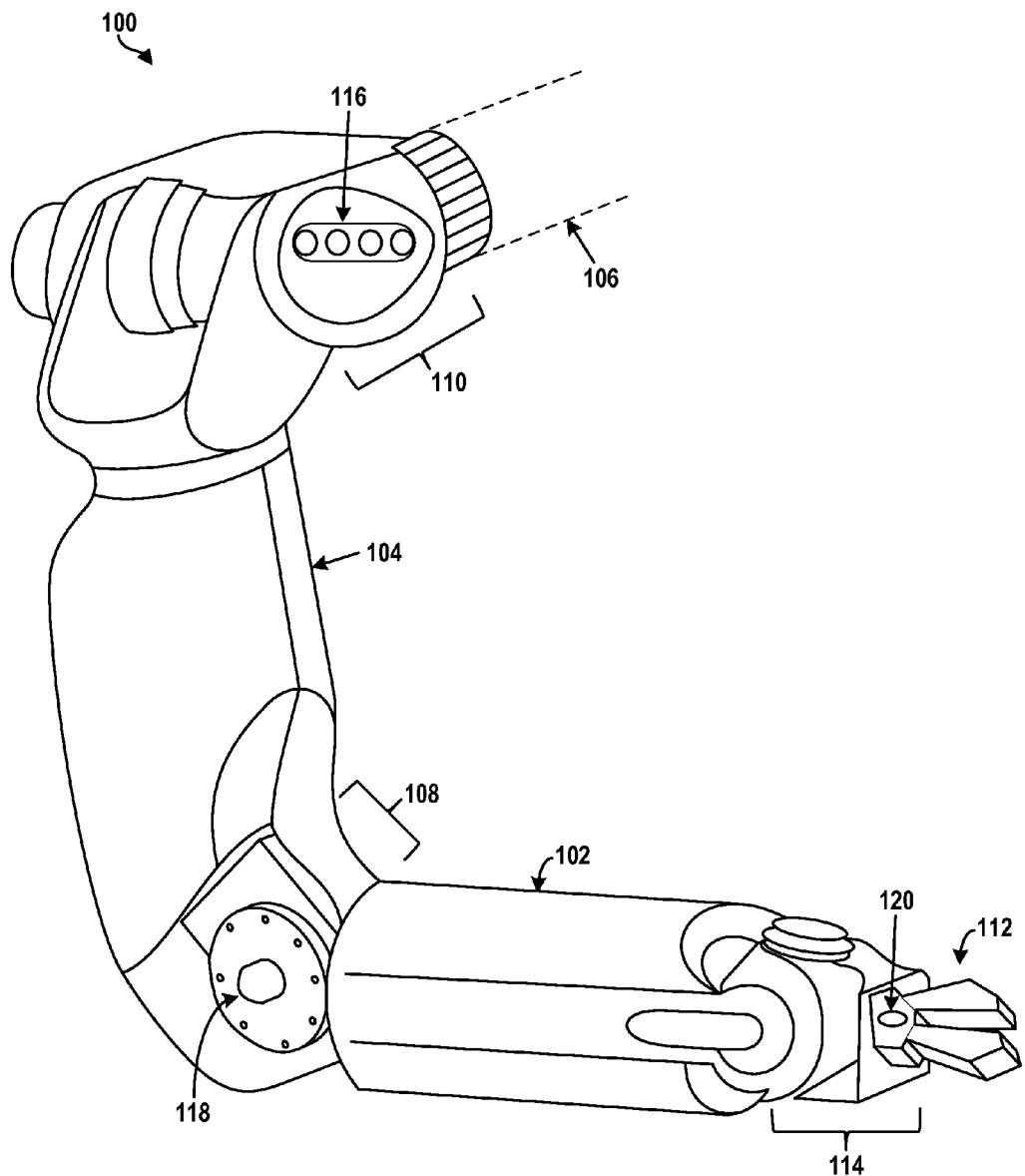
FIG. 1 illustrates an example robotic device in a form of a robotic manipulator that includes actuators coupled through joints.

Referring now to the figures, FIG. 1 illustrates an example robotic device 100 in a form of a robotic manipulator that includes actuators 102, 104, and 106 coupled through joints 108 and 110. The robotic device 100 further includes an end-of-arm tool (EOAT) 112 coupled to the actuator 102 through a joint 114.

Within examples, the actuators 102, 104, and 106 may include a torque controlled actuator that has an electric motor attached to a transmission, and the transmission may include an N-stage belt transmission arranged in a serial fashion that connects rotation of the motor to rotation of an output. Each stage of the transmission may include a timing belt, a belt tensioning mechanism, and a tension measuring system, for example. Other types of actuators may also be used as well, and any number of actuators may be coupled together to form the robotic device 100.

The robotic device 100 further includes indicators 116, 118, and 120 co-located in proximity to the joints 110, 108, and 114, respectively to provide visual feedback on the robotic device 100 at the joints 110, 108, and 114 and about the joints 110, 108, and 114. The indicators 116, 118, and 120 are provided on an exterior surface of the joints 110, 108, and 114. In other examples, the indicators 116, 118, and 120 may be on an interior surface of the joints 110, 108, and 114, and diffused or piped through a cover or through a specific feature to blend colors for overall aesthetics. In still further examples, the joints 110, 108, and 114 may include respective interface elements that connect the actuators 102, 104, 106, and the EOAT 112, and the indicators 116, 118, and 120 may be provided on the interface elements so as to be located at or near the joints 110, 108, and 114.

The indicators 116, 118, and 120 may be or include any number or type of indicators, such as lights, light emitting diodes (LEDs), displays, digital read-outs, or other types of electrical indicators. The indicators 116, 118, and 120 may further includes multiple indicators, such as multiple LEDs as shown in the indicator 116, or single indicators as shown by the indicators 118 and 120.

The robotic device 100 may further include a controller (not shown) programmable to control the indicators 116, 118, and 120, respectively that are co-located proximal to the joints 110, 108, and 114 to provide the visual feedback indicative of the operating status of the joints 110, 108, and 114. Thus, the controller may be electronically connected or in communication with the indicators 116, 118, and 120 to control operation of the indicators 116, 118, and 120.

In one example, the visual feedback includes information indicative of an operating status of the joints 110, 108, and 114 including an indication of an amount of torque that the respective joints 110, 108, and 114 are experiencing. The visual feedback may include or indicate other information as well, such as an operating status of the joints 110, 108, and 114 or an operating status of the actuators 102, 104, 106, and the EOAT 112. An operating status may include normal, medium, or overload, or may provide more detailed information such as related to wear and tear of the joint (based on an age of the joint, an amount of movement of the joint over time, etc.), information related to metal fatigue (e.g., derived from performance measurements of the joint due to speed of rotation), or other information related to any type of operating characteristic. The visual feedback information may also indicate whether any of the joints 110, 108, and 114 is experiencing a given amount of torque outside or within operating limits, or above or below a given threshold amount.

The robotic device 100 in FIG. 1 is in a form of a robotic manipulator, such as an arm of a robot. However, the robotic device 100 may take other forms, and any combination of actuators coupled together through joints may be provided that include one or more indicators at the joints to provide the visual feedback information.

Figure 2A:
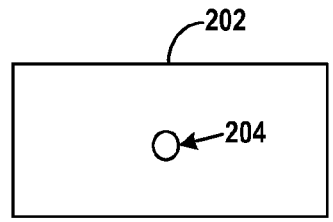
FIG. 2A illustrates an example faceplate to couple to a joint including a light emitting diode (LED).

FIGS. 2A-2F illustrate example indicators and indicator displays. In one example, FIG. 2A illustrates a faceplate 202 to couple to a joint including a light emitting diode (LED) 204. The LED 204 may be a multi-color, and may be configured to light at a given color to indicate whether a joint is experiencing a given amount of torque outside or within operating limits. As an example, the LED 204 may light red to indicate a torque outside of an operating limit, green to indicate a torque within operating limits, and yellow to indicate torques at about the limit. In further examples, the LED 204 may be configured to light at an intensity level based on the amount of torque that the one or more joints is experiencing, such that the LED 204 is brighter for higher levels of torque. Still further, in other examples, the LED 204 may provide the visual feedback using blinking patterns, light patterns, or color patterns that map to a level of torque being applied or experienced by the joint.

Figure 2B:
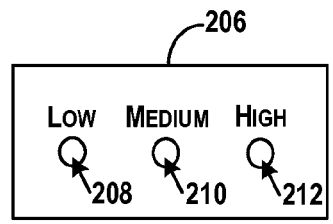
FIG. 2B illustrates another example faceplate to couple to a joint that includes multiple lights.

FIG. 2B illustrates another example faceplate 206 to couple to a joint that includes multiple lights 208, 210, and 212. The lights 208, 210, and 212 may be LEDs or other lights, and the faceplate 206 may include textual indications of "LOW", "MEDIUM", and "HIGH" as well for indication of an amount of torque applied by or experienced by the joint due to which of the lights 208, 210, and 212 is lit. Any of the lights 208, 210, and 212 may also be multi-color lights as well.

Figure 2C:
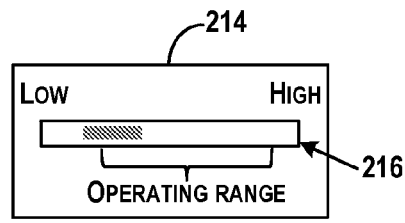
FIG. 2C illustrates another example faceplate to couple to a joint that includes an indicator in a form of a slider bar with markings to show an operating range of the joint.

FIG. 2C illustrates another example faceplate 214 to couple to a joint that includes an indicator in a form of a slider bar 216 with markings to show an operating range of the joint. The operating range may refer to any number of operating characteristics including torque or tension, for example. The faceplate 214 also includes textual indications of "LOW" and "HIGH", and the slider bar 216 may be digital and light up along the slider bar 216 to illustrate an operating status of the joint.

Figure 2D:
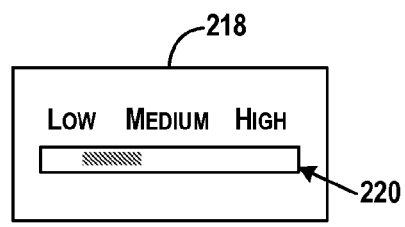
FIG. 2D illustrates another example faceplate to couple to a joint that includes an indicator in a form of another slider bar.

FIG. 2D illustrates another example faceplate 218 to couple to a joint that includes an indicator in a form of another slider bar 220, and the faceplate 218 includes textual indications of "LOW", "MEDIUM", and "HIGH". The slider bar 220 may be digital and light up along the slide bar 220 to illustrate an operating status of the joint.

Figure 2E:
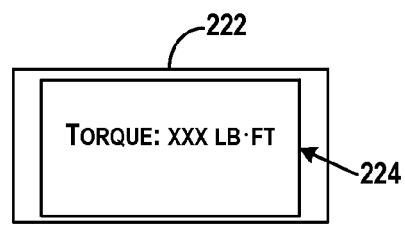
FIG. 2E illustrates another example faceplate to couple to a joint that includes a digital readout display.

FIG. 2E illustrates another example faceplate 222 to couple to a joint that includes a digital readout display 224. The digital readout display 224 may be programmed to indicate any number of information related to operating characteristics of the joint, such as an amount of torque being applied by or experienced by the joint. Additional or alternative data may be displayed as well for operating status, such as an amount of time that the joint experiences torque outside of operating limits, a health status indication of the joint, an identification of the joint, an age of the joint, information indicating mileage of the joint (or amount of usage of the joint), or still other information.

Figure 2F:
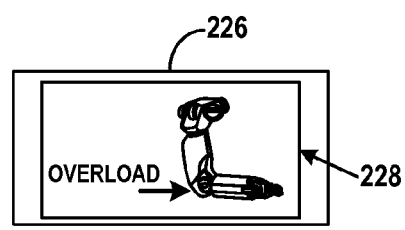
FIG. 2F illustrates another example faceplate to couple to a joint that includes a display.

FIG. 2F illustrates another example faceplate 226 to couple to a joint that includes a display 228. The display 228 may be programmed to display any number or type of information related to operating characteristics of the joint, such a display of an arm of the robotic device, and an illustration showing any joint that may be experiencing an amount of torque outside of an operating limit (e.g., an overload on a joint). Additional or alternative data may be displayed as well to visually indicate an operating status of the joint, and at the joint. Any types of information regarding characteristics of the joint, how the joint is currently operating, or how the joint has operated may be provided as well.

Within examples, any of the example indicators and indicator displays in FIGS. 2A-2E may be provided co-located at a joint of a robotic device to illustrate operating status of the joint, and at the joint. In further examples, any of the example indicators and indicator displays in FIGS. 2A-2E may be provided in proximity to joints, such as on or around a joint, or on a surface of an actuator that couples to the joint and is adjacent to the joint, for example. Within such examples, the indicators are providing information of the joint, and the indicators are located at or near the joint so as to provide the information at an area of the robotic device that the information pertains to.

Figure 3:
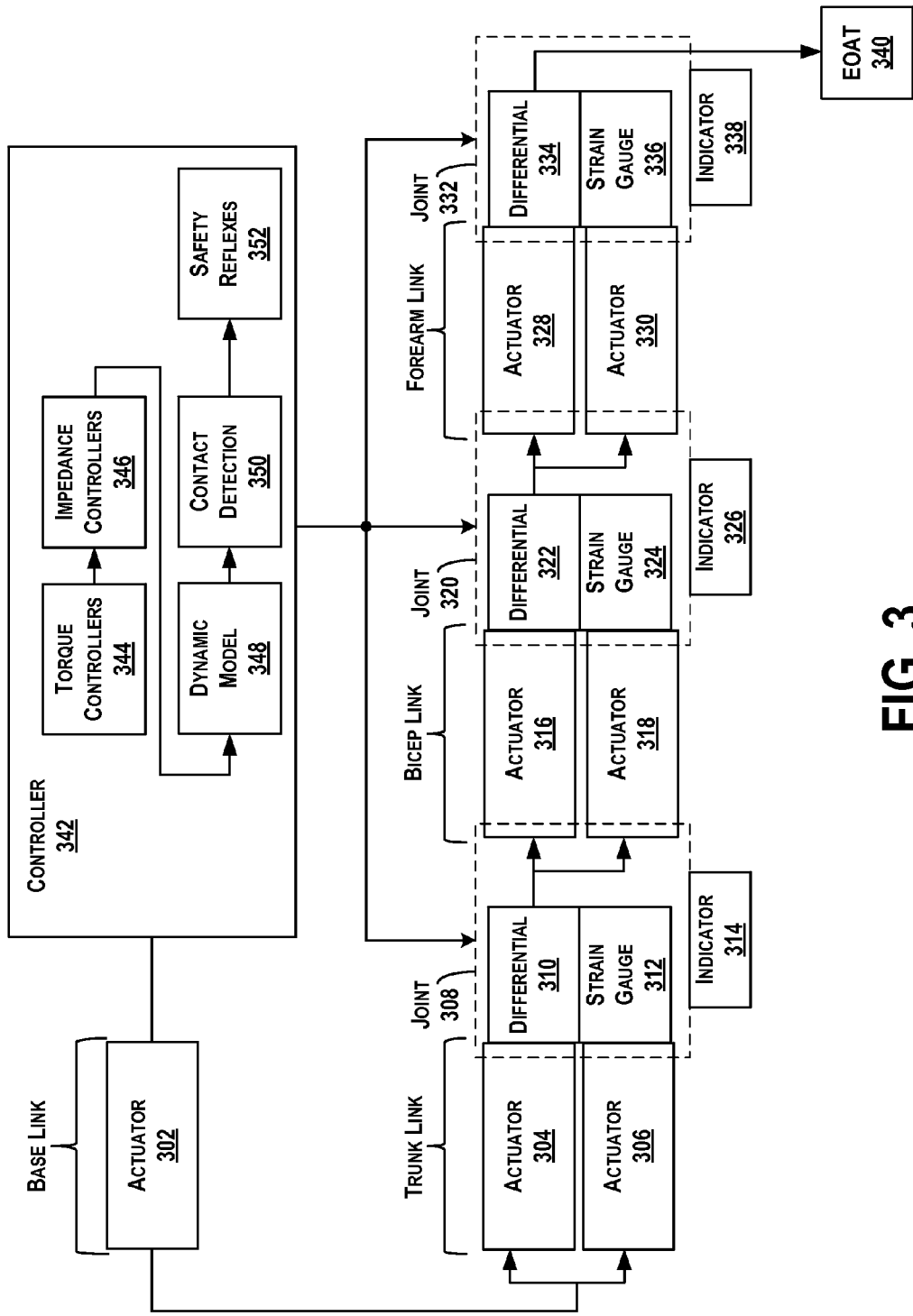
FIG. 3 is a block diagram illustrating an example system for control of a robotic device.

FIG. 3 is a block diagram illustrating an example system for control of a robotic device. The system includes a base link comprising a single actuator 302, coupled to a trunk link comprising side-by-side actuators 304 and 306 coupled to a joint 308. The joint 308 includes a differential 310, a strain gauge 312, and an indicator 314. The strain gauge 312 determines a tension experienced by the actuators 304 and 306 at the joint 308, for example.

The differential 308 connects to a bicep link that comprises side-by-side actuators 316 and 318 coupled to a joint 320. The joint 320 includes a differential 322, a strain gauge 324, and an indicator 326. The strain gauge 324 determines a tension experienced by the actuators 316 and 318 at the joint 320, for example.

The differential 322 connect to a forearm link that comprises actuators 328 and 330 coupled to a joint 332. The joint includes a differential 334, a strain gauge 336, and an indicator 338. The strain gauge 336 determines a tension experienced by the actuators 328 and 330 at the joint 332, for example.

The differential 334 outputs to end-of-arm-tooling (EOAT) 340. Thus, the base link, trunk link, bicep link, and forearm link may be modular links coupled to form a seven degree-of-freedom (DOF) robotic arm.

The system may also include a controller 342 coupled to the base link, the trunk link, the bicep link, and the forearm link to handle control at a deterministic rate and command desired torques to actuators. The controller 342 may include torque controllers 344 and impedance controllers 346 to determine motor currents for the actuators of the links based on output torques in a feedback control loop. Other hybrid force-position controllers and position controllers as would be suitable for a robotic arm may be used as well. A dynamic model 348 may also be used based on measured link inertias, accelerations, and velocities, to compute expected instantaneous torques during a known task. A contact detector 350 may compare such expectations against measured torques provided by sensors (e.g., strain gauges 312, 324, and 336), and a difference above a specified threshold can be flagged as unexpected contact with a person, object, or environment. A safety reflex 352 may adapt control policy to react appropriately to the contact. Reactions may include reversal of torques, locking of motor brakes, changing to a low impedance gravity compensation mode, or modification of the arm trajectory, for example.

The controller 342 may further be programmable to control the indicators 314, 326, and 338 that are co-located proximal to the joints 308, 320, and 332 to provide visual feedback indicative of the operating status of the joints 308, 320, and 332. As an example, the controller 342 may receive information indicating a status of respective joints, and may be coupled to the indicators 314, 326, and 338 to control the indicators 314, 326, and 338 co-located proximal to the joints 308, 320, and 332 to provide the visual feedback indicative of the status of the respective joints. In one example, the controller 342 may also be coupled to the strain gauges 312, 324, and 336 for receiving information indicating a tension applied by or experienced by the respective actuators (or information from which a tension applied by or experienced by the respective actuators may be derived), and may control the indicators 314, 326, and 338 to provide the visual feedback indicative of the tension experienced.

As a specific example, the controller 342 may cause the indicator 314 to illuminate red when the joint 308 is experiencing a torque outside of an operating limit, and in such a scenario, the joints 320 and 332 may be at or outside of operating limits as well causing the indicators 326 and 338 to be illuminated yellow (e.g., at or near a limit) or red (e.g., outside the limit). Thus, visual feedback can be provided that includes respective information indicative of whether any of the joints 308, 320, and 332 is experiencing a given amount of torque outside, within, or near operating limits based on a respective indicator at a respective joint being activated. The indicators 314, 326, and 338 may include LEDs for lighting at a given color to indicate whether respective joints are experiencing a given amount of torque outside or within operating limits of the respective joints. The indicators 314, 326, and 338 may not be illuminated when the robotic device is not being operated (or is off), or the indicators 314, 326, and 338 may also not be illuminated when the operating status of the joints 308, 320, and 332 is acceptable or within operating limits. The controller 342 may be programmed to illuminate the indicators at times at which the joints 308, 320, and 332 are experiencing strain above threshold limits, for example.

Although FIG. 3 illustrates one controller 342, multiple controllers may be provided for each joint to couple to the strain gauges 312, 324, and 336 for receiving information indicating respective tensions and for controlling the indicators 314, 326, and 338 co-located proximal to the joints to provide the visual feedback indicative of the respective tensions experienced.

Figure 4:
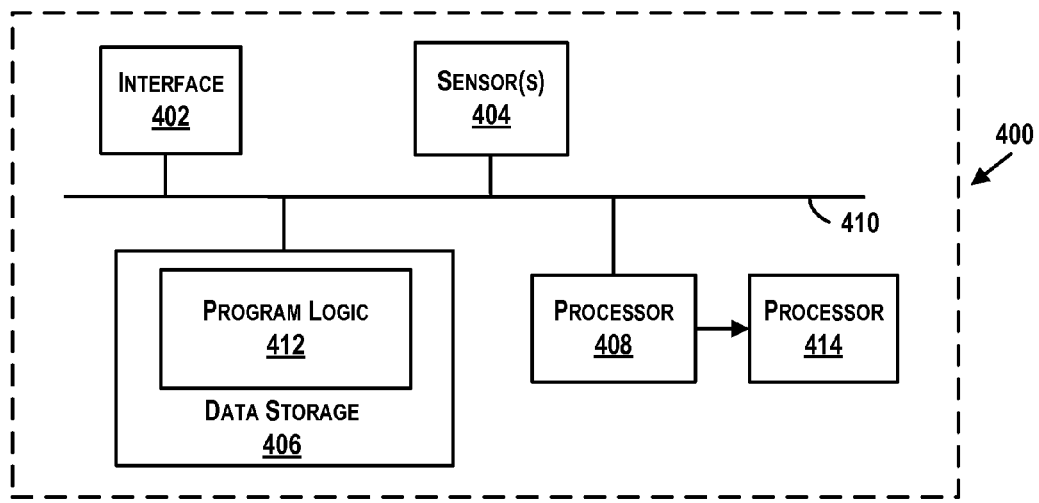
FIG. 4 illustrates a schematic drawing of an example computing device.

The controller 342 may take the form of a computing device, such as illustrated in FIG. 4, which illustrates a schematic drawing of an example computing device 400. In some examples, some components illustrated in FIG. 4 may be distributed across multiple computing devices. However, for the sake of example, the components are shown and described as part of one example device 400. The device 400 may be or include a mobile device, desktop computer, tablet computer, or similar device that may be configured to perform the functions described herein.

The device 400 may include an interface 402, sensor(s) 404, data storage 406, and a processor 408. Components illustrated in FIG. 4 may be linked together by a communication link 410. The communication link 410 is illustrated as a wired connection; however, wireless connections may also be used. The device 400 may also include hardware to enable communication within the device 400 and between the device 400 and other computing devices (not shown), such as a server entity. The hardware may include transmitters, receivers, and antennas, for example.

The interface 402 may be configured to allow the device 400 to communicate with another computing device (not shown), such as a server. Thus, the interface 402 may be configured to receive input data from one or more computing devices, and may also be configured to send output data to the one or more computing devices. The interface 402 may also be configured to receive input from and provide output to an actuator, a modular link of a robot arm, or indicators of a joint of the arm, for example. The interface 402 may include a receiver and transmitter to receive and send data, or may be hard-wired to components to send and receive data. In other examples, the interface 402 may also include a user-interface, such as a keyboard, microphone, touchscreen, etc., to receive inputs as well.

The sensor 404 may include one or more sensors, or may represent one or more sensors included within the device 400. Example sensors include an accelerometer, gyroscope, pedometer, light sensors, microphone, camera, contact rollers, load cells, strain gauges or other context-aware sensors that may collect data of the actuators or joints and provide the data to the data storage 406 or processor 408.

The processor 408 may be configured to receive data from the interface 402, the sensor 404, and the data storage 406. The data storage 406 may store program logic 412 that can be accessed and executed by the processor 408 to perform functions executable to determine instructions for operation of actuators or indicators on joints, for example. Example functions include determination of tension experienced by the actuators or output torque of the system, and control of indicators to light or provide visual feedback information at the joints and about operating characteristics of the joints. Any functions described herein, or other example functions for the robotic device may be performed by the device 400 or one or more processors 408 of the device via execution of instructions stored on the data storage 406 or otherwise received.

The device 400 is illustrated to include an additional processor 414. The processor 414 may be configured to control other aspects of the device 400 including displays or outputs of the device 400 (e.g., the processor 414 may be a GPU). Example methods described herein may be performed individually by components of the device 400, or in combination by one or all of the components of the device 400. In one instance, portions of the device 400 may process data and provide an output internally in the device 400 to the processor 414, for example. In other instances, portions of the device 400 may process data and provide outputs externally to other computing devices.

Thus, within examples described herein, a robotic device can include multiple actuators coupled through joints to form a robotic manipulator, and indicators are co-located in proximity to the joints to provide visual feedback on the robotic manipulator at the joints and about the one or more joints. As described, the actuators may be coupled through joints to form a multiple degree-of-freedom (DOF) robotic manipulator, and the indicators can be independently operated to provide visual feedback on the robotic manipulator at the joints and about the joints, respectively.

Within some examples herein, operations may be described as methods for performing functions, and methods may be embodied on a computer program product (e.g., a tangible computer readable storage medium or non-transitory computer readable medium) that includes instructions executable to perform the functions.

Figure 5:
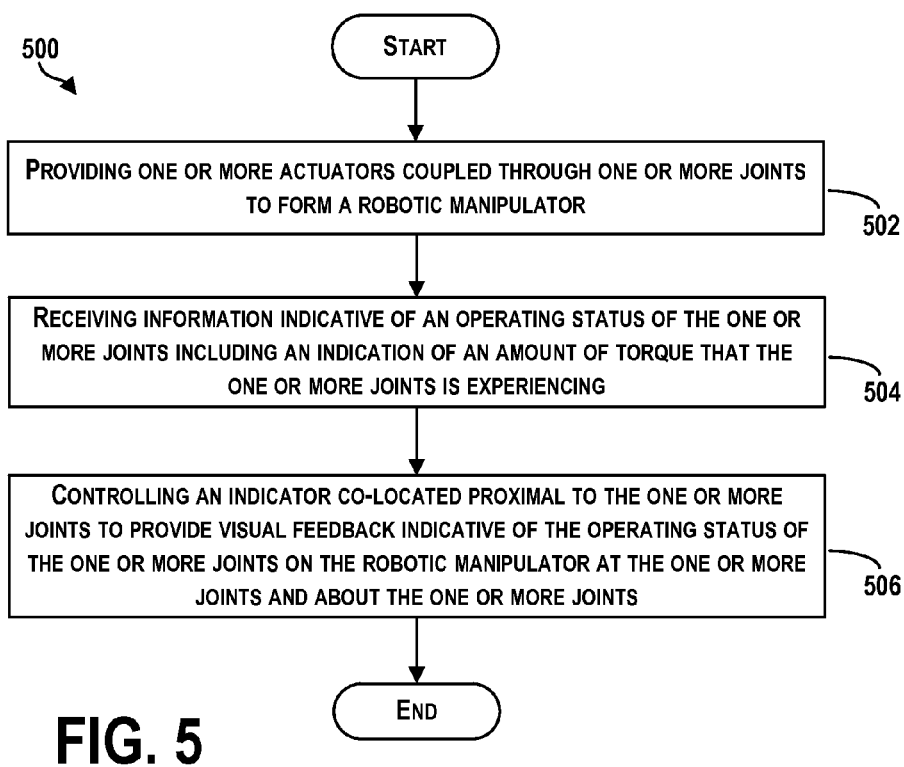
FIG. 5 is a flowchart illustrating an example method for operating a robotic device.

FIG. 5 is a flowchart illustrating an example method 500 for operating a robotic device. The method 500 may be embodied as computer executable instructions stored on non-transitory media, for example. At block 502, the method 500 includes providing one or more actuators coupled through one or more joints to form a robotic manipulator. At block 504, the method 500 includes receiving information indicative of an operating status of the one or more joints including an indication of an amount of torque that the one or more joints is experiencing. At block 506, the method 500 includes controlling an indicator co-located proximal to the one or more joints to provide visual feedback indicative of the operating status of the one or more joints on the robotic manipulator at the one or more joints and about the one or more joints.

The robotic device 100 described in FIG. 1 or the system described in FIG. 3 above may be used in many implementations. Example implementations include within a modular robot link or actuator system.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A robotic device comprising:
   a robotic manipulator comprising a plurality of links connected by one or more joints, wherein the plurality of links include one or more actuators coupled through the one or more joints;
   an indicator located on a surface of the one or more joints to provide visual feedback on the robotic manipulator at a location on the one or more joints and the visual feedback is about the one or more joints, wherein the visual feedback includes information indicative of an operating status of the one or more joints, and wherein the operating status includes indicating an amount of torque that the one or more joints is experiencing;
a sensor positioned at the one or more joints for determining a tension experienced by the one or more actuators at the one or more joints; and
a controller programmable to receive information indicating the tension and to control the indicator co-located proximal to the one or more joints to provide the visual feedback indicative of the amount of torque that the one or more joints is experiencing based on the tension experienced.

2. The robotic device of claim 1, wherein the visual feedback includes information indicative of whether the one or more joints is experiencing a given amount of torque outside or within operating limits.

3. The robotic device of claim 1, wherein the indicator includes a multi-color light emitting diode (LED).

4. The robotic device of claim 3, wherein the visual feedback provided by the LED has an intensity level based on the given amount of torque that the one or more joints is experiencing.

5. The robotic device of claim 1, wherein the indicator includes a multi-color light emitting diode (LED) for lighting at a given color to indicate whether the one or more joints is experiencing a given amount of torque outside or within operating limits.

6. The robotic device of claim 1, wherein the indicator provides the visual feedback using one or more of blinking lights, light patterns, or color patterns.

7. The robotic device of claim 1, wherein the indicator is provided on an exterior surface of the one or more joints.

8. The robotic device of claim 1, wherein the one or more actuators comprise a plurality of actuators coupled through a plurality of joints to form a multiple degree-of-freedom (DOF) robotic manipulator, and
the robotic device further comprises:
a plurality of indicators co-located in proximity to the plurality of joints to provide visual feedback on the robotic manipulator at the plurality of joints and about the plurality of joints.

9. A robotic device comprising:
a robotic manipulator comprising a plurality of links connected by one or more joints, wherein the plurality of links include one or more actuators coupled through the one or more joints;
an indicator located on a surface of the one or more joints to provide visual feedback on the robotic manipulator at a location on the one or more joints and the visual feedback is about the one or more joints, wherein the visual feedback includes information indicative of an operating status of the one or more joints, and wherein the operating status includes indicating an amount of torque that the one or more joints is experiencing;
a strain gauge for determining a tension experienced by the one or more actuators at the one or more joints; and
a controller coupled to the strain gauge for receiving information indicating the tension and for controlling the indicator co-located proximal to the one or more joints to provide the visual feedback indicative of the amount of torque that the one or more joints is experiencing based on the tension experienced.

10. The robotic device of claim 9, wherein the visual feedback includes information indicative of an operating status of the one or more joints.

11. The robotic device of claim 9, wherein the visual feedback includes information indicative of whether the one or more joints is experiencing a given amount of torque outside or within operating limits.

12. The robotic device of claim 9, wherein the indicator includes a multi-color light emitting diode (LED), and wherein the visual feedback provided by the LED has an intensity level based on the amount of torque that the one or more joints is experiencing.

13. The robotic device of claim 9, wherein the one or more actuators comprise a plurality of actuators coupled through a plurality of joints to form a multiple degree-of-freedom (DOF) robotic manipulator, and
the robotic device further comprises:
a plurality of indicators co-located in proximity to the plurality of joints to provide visual feedback on the robotic manipulator at the plurality of joints and about the plurality of joints.

14. A robotic device comprising:
a robotic manipulator comprising a plurality of links connected by a plurality of joints, wherein the plurality of links include a plurality of actuators coupled through the plurality of joints;
a plurality of indicators located on respective surfaces of the plurality of joints to provide visual feedback on the robotic manipulator at respective locations on the plurality of joints and the visual feedback is about the plurality of joints, wherein the visual feedback includes information indicative of operating statuses of the plurality of joints, and wherein the operating statuses include indicating respective amounts of torque that the plurality of joints are experiencing;
a plurality of sensors positioned at the plurality of joints for determining respective tensions experienced by the plurality of actuators at the plurality of joints, and
a controller coupled to the plurality of indicators for receiving information indicating the respective tensions and for and for controlling the plurality of indicators co-located proximal to the plurality of joints to provide the visual feedback indicative of the respective amounts of torque that the plurality of joints are experiencing based on the respective tensions experienced.

15. The robotic device of claim 14, wherein the visual feedback includes respective information indicative of whether any of the plurality of joints is experiencing a given amount of torque outside or within operating limits based on a respective joint indicator at a respective joint being activated.

16. The robotic device of claim 14, wherein the plurality of indicators include respective multi-color light emitting diodes (LEDs) for lighting at a given color to indicate whether respective joints of the plurality of joints are experiencing a given amount of torque outside or within operating limits of the respective joints.

17. The robotic device of claim 14, wherein the plurality of actuators are coupled to each other at the plurality of joints, and wherein the plurality of indicators are provided on exterior surfaces of the plurality of actuators.

18. The robotic device of claim 14, wherein the plurality of joints comprise respective interface elements that connect the plurality of actuators, and wherein the plurality of indicators are provided on the respective interface elements.

* * * * *